United States Patent [19]

Lacy

[11] Patent Number: 4,682,164

[45] Date of Patent: Jul. 21, 1987

[54] ATTACHMENT FOR REMOTE CONTROL OF A PLURALITY OF SIGNAL MONITORS

[76] Inventor: Donald D. Lacy, 11400 Wilson Rd., Utica, Ohio 43080

[21] Appl. No.: 935,072

[22] Filed: Nov. 21, 1986

Related U.S. Application Data

[63] Continuation of Ser. No. 588,754, Mar. 13, 1984, abandoned.

[51] Int. Cl.$^4$ .............................................. H04Q 1/00
[52] U.S. Cl. ............................... 340/825.03; 307/112; 340/825.5; 379/457
[58] Field of Search ......................................... 307/112

[56] References Cited

U.S. PATENT DOCUMENTS

| | | | |
|---|---|---|---|
| 2,558,707 | 6/1951 | Janssen et al. ................... | 307/112 X |
| 3,337,841 | 8/1967 | Wainwright et al. ............ | 179/1.1 X |
| 3,453,749 | 7/1969 | Snedeker .......................... | 179/1.1 X |
| 3,646,278 | 2/1972 | Panizzi ............................. | 307/112 X |
| 3,761,630 | 9/1973 | Silitch .................................. | 370/86 |
| 4,225,753 | 9/1980 | Chown et al. ........................ | 370/86 |

*Primary Examiner*—Ulysses Weldon
*Attorney, Agent, or Firm*—Robert E. Stebens

[57] ABSTRACT

An attachment for remote control of a plurality of data stations remote from each other and from a central controller having simple and convenient arrangements to put all the burden of powering and most switching of the attachment in the central controller.

A minimum number of transmission lines are used, yet it allows two-way data transmissions as well as a request-to-receive signal from any single remote data station to any of the remaining data stations, at the desire of the operator of the central controller.

15 Claims, 4 Drawing Figures

ATTACHMENT FOR REMOTE CONTROL OF A PLURALITY OF SIGNAL MONITORS

This is a continuation of co-pending application Ser. No. 588,754 filed on Mar. 13, 1984, now abandoned.

BACKGROUND OF THE INVENTION

1. Field of the Invention

This invention pertains to the field of data equipment interconnection. In greater particularity, this invention pertains to an arrangement to control the routing of data signal to a selected plurality of signal monitors.

2. Description of the Prior Art

Prior art method of interconnecting units of data equipment required that a separate means of transmitting perceptible signals, characterized by a pair of twisted wires and a coax cable, be used for each direction of transmission.

An example of this method is disclosed by U.S. Pat. No. 4,115,849.

Other prior art methods of interconnecting units of data equipment allows perceptible signals to be sent and received over a single cable by way of frequency conversion that shifts, for example, the transmit signal to a frequency located in a different portion of the spectrum of frequencies, away from the frequency used for the receive signal. These methods are used in different realizations of local-area networks that support a large number of channels of data, voice, and video by assigning different frequencies to each channel.

The drawbacks of operation of these prior art disclosures have been such that use of prior art circuitry has been always complicated and expensive in terms of manufacturing cost and mass productivity, even in the simplest configurations.

SUMMARY OF THE INVENTION

A general object of this invention is to provide, in relatively simple configurations, improved means for interconnecting units of data equipment without the drawbacks disclosed by prior art means.

A further general object of this invention is to provide, in relatively simple configurations, improved means for one master unit of data equipment to route signals generated at the master unit to a plurality of slave units of data equipment.

Another more specific object of this invention is to provide improved means for one master unit of data equipment to receive signals generated from any of the slave units of data equipment and send these very same signals to a selected plurality of the remaining slave units.

Yet a further object of this invention is to provide an improved means for one master unit of data equipment to request remotely a selected plurality of slave units to receive signals from the master unit.

Other objects, features and advantages of this invention will become more fully apparent hereinafter from the following description and drawings, which illustrate preferred embodiments of the invention.

DESCRIPTION OF THE PREFERRED EMBODIMENTS

Figure 1:
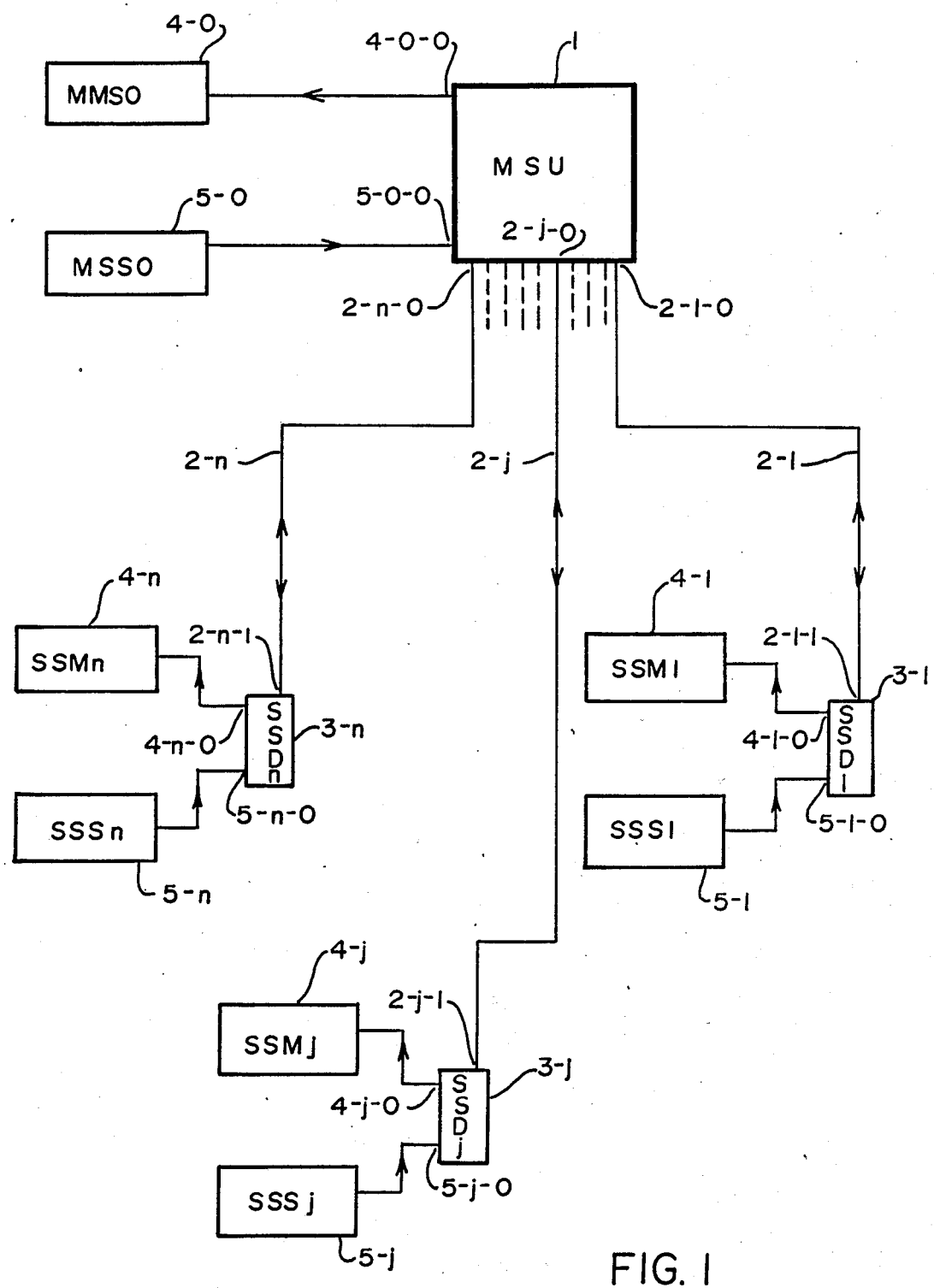
FIG. 1 is a block diagram explanatory of the interconnection between the master switching unit and the plurality of slave switching devices.

Referring to FIG. 1, numeral 1 indicates a master switching unit MSU; 2-1 to 2-$n$ indicate n perceptible-signal transmission means, characterized by coax cables; 3-1 to 3-$n$ designate n slave switching devices SSD1 to SSDn. Each transmission means 2-1 to 2-$n$ has one of its ends connected to the master switching unit MSU by connecting means characterized by commercial-standard mating connectors 2-2-1 to 2-$n$-1. Numeral 4-0 designates a master signal monitor MMSO and 5-0 designates a master signal source MSSO characterized by a computer in output mode, both being connected to connectors 4-0-0 and 5-0-0 of the master switching unit, respectively.

Numeral 4-1 designates a slave signal monitor SSM1 and 5-1 designates a slave signal source SSS1, both being connected to connectors 4-1-0 and 5-1-0 of the slave switching device 3-1, respectively. Corresponding to this last description, a general numeral 4-$j$ will be adopted to designate a slave signal monitor SSMj, and 5-$j$ will be adopted to designate a slave signal source SSSj, both being connected to connectors 4-$j$-0 and 5-$j$-0 of the slave switching device 3-$j$, respectively. The adopted index j will take on values of 1,2,3 . . . n for a plurality of n slave switching devices.

Figure 2:
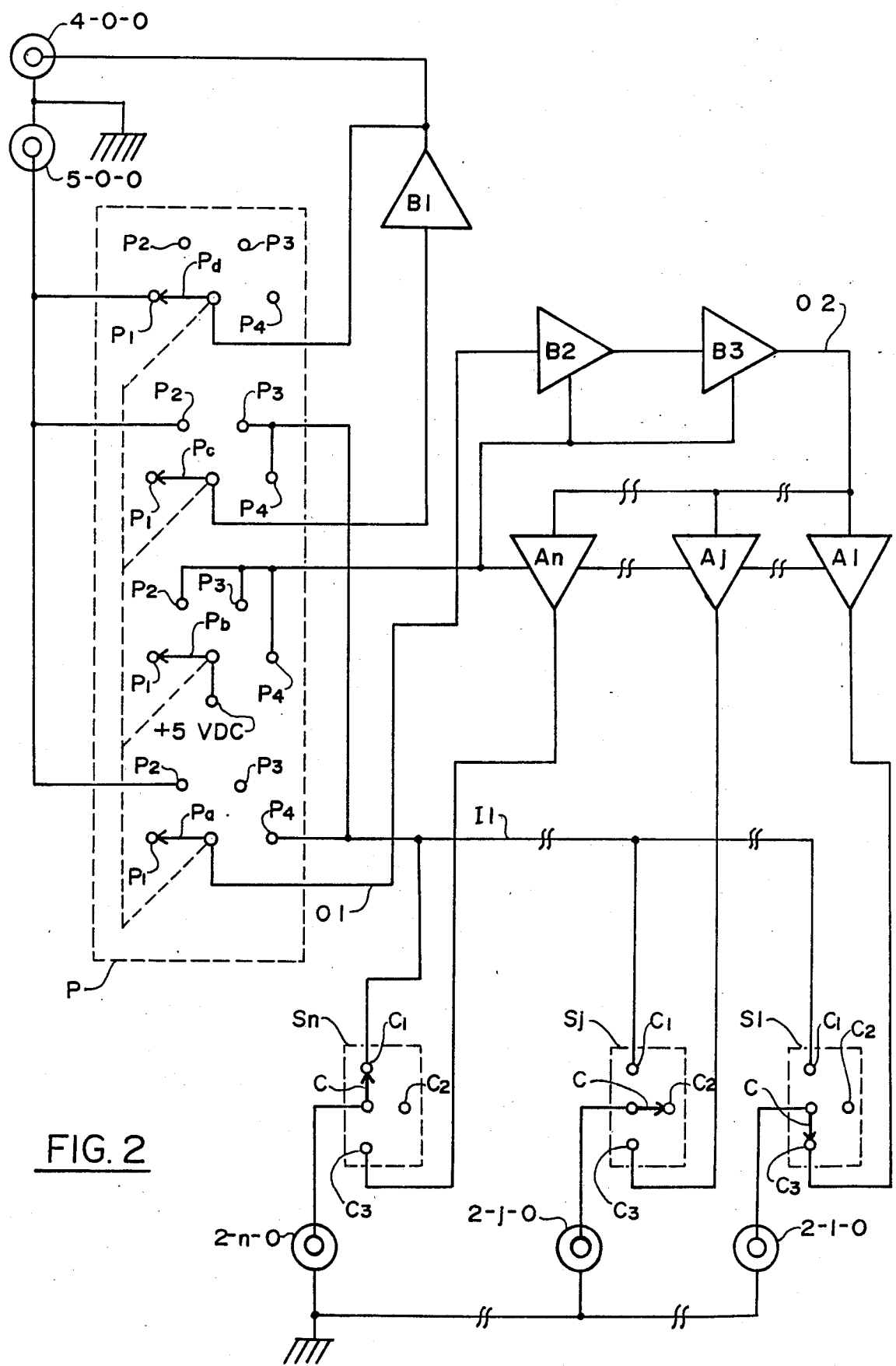
FIG. 2 is a schematic diagram showing the preferred construction of the master switching unit.
Figure 3:
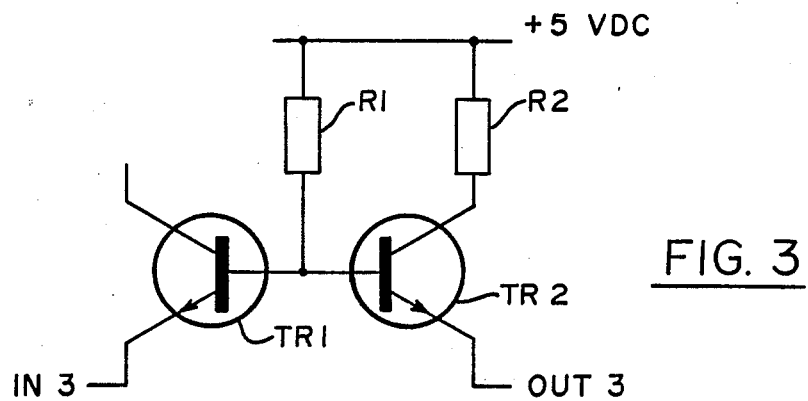
FIG. 3 is a schematic diagram showing the preferred construction of one amplifying means of the master switching unit.

FIG. 2 shows the schematic diagram of a preferred embodiment of the master switching unit. Connectors 2-1-0, . . . to 2-$n$-0, correspond to the same of like numerals in FIG. 1. A1 to An are perceptible signal amplifying means realizable by any state of the art circuitry. A preferred embodiment is shown in FIG. 3 for an example of video signal to be amplified in terms of current and power. In this very simple circuit, it can be seen that, with proper choice of resistors R1, R2, and transistors TR1 and TR2, any low power signal varying between 0 and 5 Volts DC applied between points IN3 and common electrical ground will cause a signal of appreciably higher power varying between 0 and about 5 Volts DC, respectively, to appear between point OUT3 and said ground.

Referring back to FIG. 2, a plurality of switches S that are differentiated by sub-numerals/alphabetic letters S1, . . . Sn designate preferably n switches of the single-pole, three position, for routing signals through the switches. These switches S for convenience of description are designated as secondary control switches in that they perform a second control function in the system. FIG. 2 being viewed in the upright manner, these three positions for each switch S1 to Sn are defined hereinafter as position C1 when the movable center contact C of a switch is shorted to the upper one;

position C2 when no the center contact is not shorted to either the upper or lower one; and position C3 when the center contact is shorted to the lower one.

It can be seen now that, for any switch S1 to Sn, designated hereinafter in all generality as Sj, (J=1, 2, 3, . . . , n), position C1 will allow perceptible signals to be input to live I1 from the corresponding connector 2-j-0;

position C3 will allow perceptible signals at line O2 to be output onto corresponding connector 2-j-0; and position C2 will leave perceptible signals on corresponding connector 2-j-0 untouched.

Always in FIG. 2, amplifying means B1, B2, and B3 are essentially made the same as any of the A1 to An. Hence, perceptible signals at line O2 are essentially the same as those at line O1, except with higher power.

The above said switchings of S1 to Sn provide partially the perceptible signal routing scheme. The remaining signal routing scheme is done by the device marked P in FIG. 2 and for convenience of description is designated the primary control switch. This switch P is preferably a 4-pole, 4-position switch. The 4 positions of this switch are designated as P1, P2, P3 and P4, starting from the very leftmost position in FIG. 2 and going clockwise. Each of the four poles, or sections, of the primary control switch P has a movable contact designated Pa, Pb, Pc and Pd, respectively. As is conventional for a switch of this type, the movable contacts may be mechanically intercoupled to enable their simultaneous displacement to the same selected one of the positions $P_1$, $P_2$, $P_3$, or $P_4$ for effecting the signal routing as hereinafter described.

Following the signals around switch P in FIG. 2, it can be seen that a. position P1 will input perceptible signals from connector 5-0-0 and output the same signals to connector 4-0-0, thus allowing the master signal monitor to display the signals of the master signal source;

b. position P2 will input perceptible signals from connector 5-0-0 and output the same signals to connector 4-0-0 and at the same time to line O2, and from there to each selected one or more of the slave signal monitors connected to connectors 2-1-0 . . . to 2-n-0, by way of position C3 of switches Sj, (j=1, 2, 3, . . . , n);

c. position P3 will input perceptible signals from line I1, therefore from any single selected slave signal source connected to one of the connectors 2-1-0 . . . to 2-n-0, by way of position C1 of this particular switch Sj corresponding to this connector, and output said signals to connector 4-0-0, therefore to the master signal monitor;

d. position P4 will input perceptible signals from line I1 and output the same signals to line O2 and to connector 4-0-0, therefore will input from any single slave signal source by way of position C1 of one of the switches Sj, and output to the master signal monitor and at the same time to selected or all other remaining slave signal monitors, again, by way of position C3 of the corresponding switches Sj of said selected or all other slave signal monitors.

Marking +5 VDC in FIG. 2 refers to the powering means of the master switching unit, having an adequate voltage with respect to ground, usually about +5 Volts DC, and having adequate power and regulation.

Figure 4:
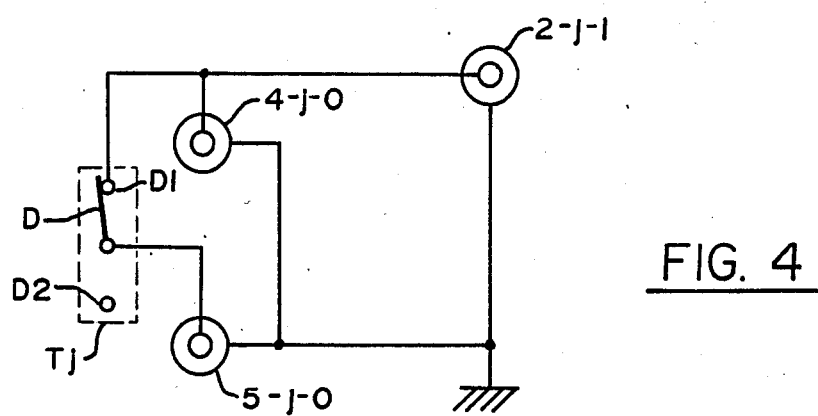
FIG. 4 is a schematic diagram showing the construction of one preferred embodiment of a slave switching device.

FIG. 4 shows one of the identical slave switching devices, having means for connecting and routing perceptible signals, implemented in the configuration where the slave signal monitors have their corresponding signal sources characterized by a computer in output mode.

Using the general index notation as above, numerals 2-j-1, 4-j-0 and 5-j-0 designate connectors of like numerals in FIG. 2 and FIG. 1.

Tj, (j=1, 2, 3, . . . n), designates a switching means of the single pole type having a movable center contact D and two positions defined as a. position D1 when the center contact is shorted to the upper one; and b. position D2 when the center contact is shorted to the lower one.

It can be seen that when a switch Tj is in position D1, perceptible signals input to connector 5-j-0 are routed directly as output to connector 4-j-0 and at the same time to connector 2-j-1. This means that if signal transmission means connected to connector 2-j-1 requires that signals be output at connector 2-j-1, everything will be all right and there is no perceptible change in the signals output to connector 4-j-0. However, it can be seen also that if signal transmission means connected to connector 2-j-1 requires that signals be input to the slave switching device at connector 2-j-1, when, in position D1, it receives signals from connector 5-j-0, it is obvious that connector 4-j-0 now receives two kinds of unrelated signals, and thus will cause the slave signal monitor connected thereto to loose synchronization in the display, and in general, to have its display torn apart in a drastic manner. In this invention, this loss of synchronization at a slave signal monitor is used systematically as a convenient way for the master switching unit operator to send the slave signal monitor operator a request to receive the signals, as well as the signals themselves routed to this slave switching device from the master switching unit.

It is intended in this invention when this loss of synchronization happens at a slave signal monitor, that the operator of the slave switching device push switch Tj to position D2 in order to get rid of the signals coming from connector 5-j-0, and to receive synchronously the signals coming from connector 2-j-1. After this, the end of request will make this slave monitor go black; and its operator may display again signals from connector 5-j-0 by pushing switch Tj to position D1.

It is clear now that by appropriate signal routing at the master switching unit, its operator can conveniently send a request to any slave switching device operator to receive, and at the same time and on the same cable the signals that, in turn, the master switching unit receives from any single one of the slave signal sources.

Numerous changes may be made in the above described arrangements and different embodiments of the invention may be made without departing from the spirit thereof; therefore, it is to be understood that all matter contained in the description and in the drawings shall not be construed as to limit the scope of the invention, which is limited only by the appended claims.

What I claim is:

1. A control system for selectively enabling monitoring at a master station or at any selected one of a plurality of slave stations of electrical signals generated by a respective computer at either the master station or by a respective computer at any one of the slave stations as selected by an operator of the master station, said control system comprising (A) a master switching unit having
 (1) a first input adapted to be connected to a master station computer signal source for reception thereat of signals generated by said master signal source,
 (2) a first output adapted to be connected to a master station signal monitor for output thereto of signals to be monitored, (3) a plurality of master inputs/outputs with each of said inputs/outputs adapted to be connected to a respective one of the slave stations for either input thereto or output therefrom of signals to be monitored, and
(4) master switching circuit means interconnecting with said first input, said first output and said inputs/outputs and selectively operable to alternatingly connect in signal transmitting relationship
 (a) said first input and said first output,
 (b) said first input and at least one of said master inputs/outputs,
 (c) one of said master inputs/outputs and said first output, or
 (d) one of said master inputs/outputs said first output and at least one other of said master inputs/outputs, and
(B) a plurality of slave switching units each of which is adapted to be operatively associated with a respective one of a plurality of slave stations, each said slave switching unit having
 (1) a slave input adapted to be connected to a computer signal source of the respective slave station for reception thereat of signals generated by said slave signal source,
 (2) a slave output adapted to be connected to a signal monitor of the respective slave station for output thereto of signals to be monitored,
 (3) a slave input/output coupled with a respective one of said master switching unit's inputs/outputs in signal transmitting relationship, and
 (4) slave switching circuit means interconnecting with said slave input and said slave input/output and connecting said slave output and input/output in signal transmitting relationship and selectively operable to connect said slave input with said slave output in signal transmitting relationship or to interrupt such signal transmitting relationship.

2. A control system according to claim 1 wherein each of said slave inputs/outputs is connected with a respective one of said master switching unit's inputs/outputs by electrical signal conductors.

3. A control system according to claim 1 wherein said slave switching circuit means includes a slave switch device selectively operable to either connect said slave input to said slave output or to disconnect said slave input from said slave output.

4. A control system according to claim 3 wherein said slave switch device is a manually actuated switch disposed in close physical proximity to the respective slave station for operation thereof by an operator of the slave station.

5. A control system according to claim 1 wherein said slave switching circuit means includes a switching circuit network having a first circuit interconnecting said slave output and said slave input/output in signal transmitting relationship, a second circuit interconnected between said slave input and said slave output, said second circuit including a slave switch device interconnected therein and selectively operable either to enable or to prevent signal transmission therebetween.

6. A control system according to claim 5 wherein said slave switch device is a manually actuated switch disposed in close physical proximity to the respective slave station for operation thereof by an operator of the slave station.

7. A control system according to claim 5 wherein each said slave switch device has first and second operating states and is selectively operable to be placed in either of said operating states, said switch device when placed in the first of its operating states completing said second circuit, thereby enabling signal transmission between said slave input and said slave output and when placed in the second of its operating states interrupting said second circuit, thereby preventing signal transmission between said slave input and said slave output.

8. A control system according to claim 7 wherein said slave switch device is a manually actuated switch.

9. A control system according to claim 1 wherein said master switching circuit means includes a master switching circuit network connecting with each of said first input, said first output and each of said master inputs/outputs for transmission of signals therebetween, said master switching network including switch means selectively operable to connect said first input, said first output and said master inputs/outputs in any of said signal transmitting relationships.

10. A control system according to claim 9 wherein said master switching circuit network includes
 a first circuit connected with said first input,
 a second circuit connected with said first output,
 third and fourth circuits selectively connectable with each of said master inputs/outputs,
 a primary control switch device interconnected between said first, second, third and fourth circuits and selectively operable to effect interconnection of said circuits in predetermined signal transmitting relationships, and
 a plurality of secondary control switch devices which are each interconnected between a respective one of said master inputs/outputs and each of said third and fourth circuits, each of said secondary control switch devices selectively operable to enable or to prevent signal transmission between the respective master input/output and either of said third and fourth circuits.

11. A control system according to claim 10 wherein each of said secondary control switch devices has first, second and third operating states and is selectively operable to be placed in any one of said three operating states, each said secondary control switch device when placed in:
 (a) the first of said operating states connecting the respective master input/output in signal transmitting relationship with said third circuit,
 (b) the second of said operating states connecting the respective master input/output in signal transmitting relationship with said fourth circuit,
 (c) the third of said operating states disconnecting the respective master input/output from each of said third and fourth circuits and preventing signal transmission therebetween.

12. A control system according to claim 11 wherein each said secondary control switch device is a manually actuated, three-position electrical switch having a selectively positionable contact connected in signal transmitting relationship with a respective one of said master inputs/outputs and first and second contacts that are each connected in signal transmitting relationship with a respective one of said third and fourth circuits, said selectively positionable contact alternatively positionable in a first or second state in electrical contact with said first or second contact, respectively, or in a third state out of electrical contact with either of said first and second contacts.

13. A control system according to claim 10 wherein said primary control switch device has first, second, third and fourth operating states and is selectively operable to be placed in any one of said four operating states, said primary control switch device when placed in:
   (a) the first of its operating states interconnecting said first and second circuits in signal transmitting relationship whereby a signal generated by the master station signal source will be transmitted to the master station signal monitor,
   (b) the second of its operating states interconnecting said first and second circuits and said first and third circuits in signal transmitting relationship whereby a signal generated by the master station signal source will be transmitted to the master station signal monitor and to the signal monitor of any one or more of said slave stations as selected by operation of the respective secondary control switch device for the slave station,
   (c) the third of its operating states interconnecting said second and third circuits in signal transmitting relationshp whereby a signal generated by a signal source of one of said slave stations as selected by operation of a respective one of said secondary control switch devices will be transmitted to the master station signal monitor,
   (d) the fourth of its operating states interconnecting said second, third and fourth circuits in signal transmitting relationship whereby a signal generated by a signal source of one of said slave stations as selected by operation of a selected one of said secondary control switch devices will be transmitted to the master station signal monitor and to the signal monitor of any other slave station as selected by operation of the respective secondary control switch device therefore.

14. A control system according to claim 13 wherein said primary control switch device includes first, second and third electrical switch mechanisms, said first switch mechanism connected in circuit with said first and second circuits, said second switch mechanism connected in circuit with said first, second and third circuits and said third switch mechanism connected in circuit with said first, third and fourth circuits.

15. A control system according to claim 14 wherein said first, second and third switch mechanism are manually operated and are mechanically interconnected for enabling concurrent operation.

* * * * *